No. 653,570. Patented July 10, 1900.
G. W. EDDY.
AIR PUMP.
(Application filed May 8, 1899.)
(No Model.)
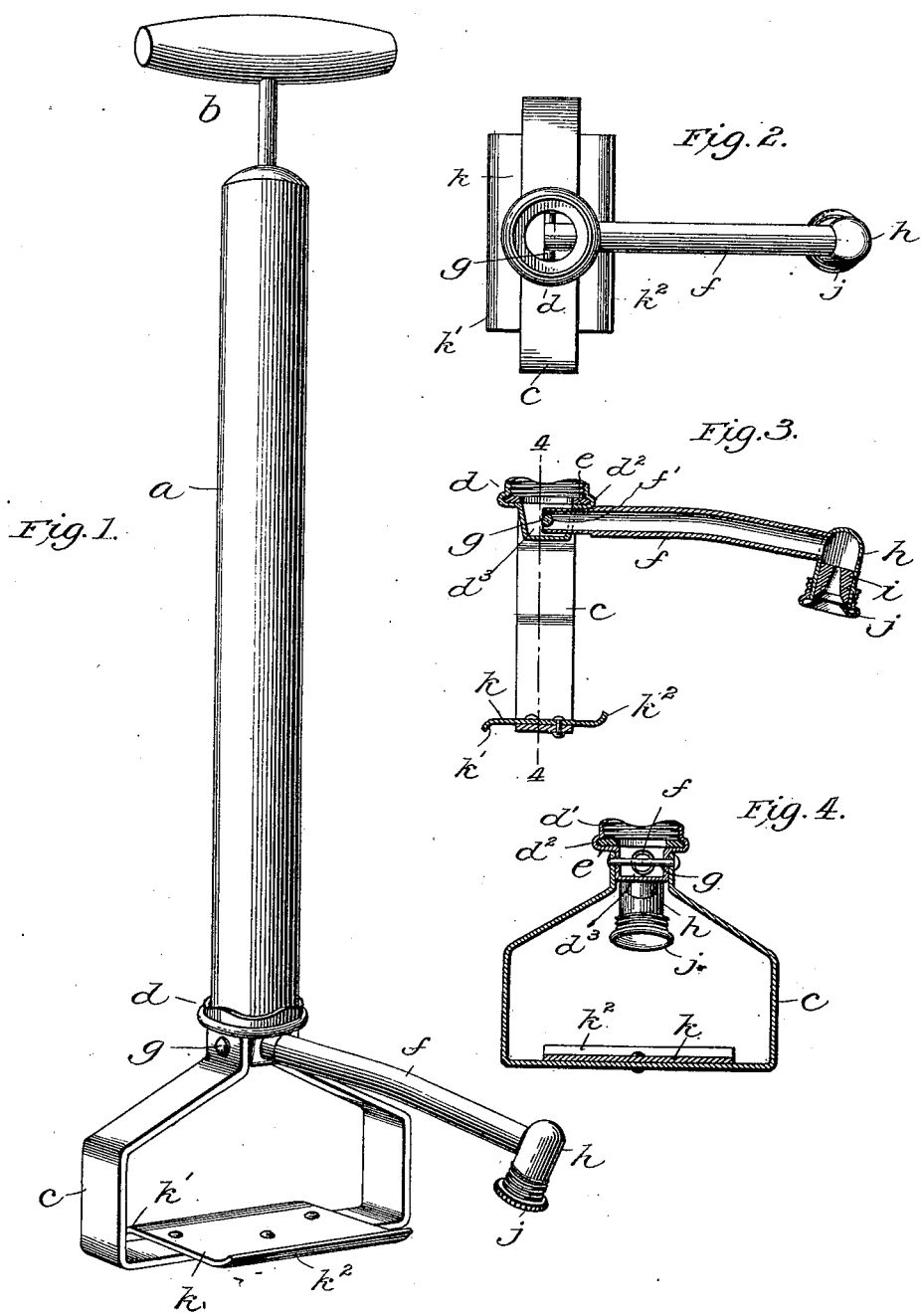

UNITED STATES PATENT OFFICE.

GEORGE W. EDDY, OF WATERBURY, CONNECTICUT, ASSIGNOR TO THE SCOVILL MANUFACTURING COMPANY, OF SAME PLACE.

AIR-PUMP.

SPECIFICATION forming part of Letters Patent No. 653,570, dated July 10, 1900.

Application filed May 8, 1899. Serial No. 715,992. (No model.)

*To all whom it may concern:*

Be it known that I, GEORGE W. EDDY, a citizen of the United States, residing at Waterbury, in the county of New Haven and State of Connecticut, have invented a certain new and useful Improvement in Air-Pumps, of which the following is a full, clear, and exact description.

This invention relates to that class of air-pumps represented in Patent No. 623,662, granted April 25, 1899, to the Scovill Manufacturing Company as assignees of John H. Goss; and the invention consists in certain improvements in the means for connecting that class of pumps with the object to be supplied with air and for supporting the pump in position while in use, all as I will proceed now more particularly to set forth and finally claim.

In the accompanying drawings, illustrating my invention, in the several figures of which like parts are similarly designated, Figure 1 is a perspective view of the complete pump. Fig. 2 is a top plan view of the lower parts, the barrel or body of the pump being detached. Fig. 3 is a vertical section taken in the plane of the length of the discharge-tube. Fig. 4 is a cross-section taken substantially in the plane of line 4 4, Fig. 3.

The barrel $a$ and plunger-rod and handle $b$ and the plunger or piston (not shown) may be as in the patent referred to or of other approved construction. The stirrup $c$ may be made of flat metal bent to shape and having its ends secured to the sides of the cap $d$, which is used to close the lower end of the barrel or body. This cap may be struck up or pressed to shape from sheet metal and has the screw-threaded flange $d'$ to engage a complemental screw-thread on the barrel, the hollow bead $d^2$ to receive the washer or packing $e$, and the exit-chamber $d^3$. This chamber is provided with a hole to receive the metal tube $f$, which may be secured therein air-tight by a solder or other joint, and its inner end is notched, as at $f'$, to engage the rivet $g$, which is passed transversely through the ends of the stirrup and the chamber $d^3$ and, if desired, reinforced by solder to unite rigidly the said stirrup, tube $f$, and cap.

Very obviously the engagement of the notched end of the tube $f$ with the rivet greatly reinforces the union of said tube with the walls of the cap-chamber and makes a stable and rigid joint capable of withstanding the rough usage to which such pumps are subjected.

In that class of pumps in which the stirrup is differently applied from what has been described the union of the tube $f$ with the pump body or barrel may be effected in other ways; but I consider the use of a rivet or equivalent reinforce or stay-piece to be important, although not indispensable.

The tube $f$ preferably is bent or curved, as shown in Fig. 3, in order the better to adapt the pump to use in inflating bicycle-tires. Said tube is provided with a metal spout or coupling $h$, containing an elastic or compressible washer $i$—say of rubber—which is made with a tapering hole, so as to enable it to be fitted air-tight to the nipple of the inflation-valve by simple pressure. The spout is provided with a perforated screw-cap $j$ to hold the washer $i$ in place and removable to permit the renewal of the washer when necessary or desirable. Other forms of spout or connecting device, fixed or movable, may be used.

The tread of the stirrup is provided with an attached or other plate $k$, having one end turned down, as at $k'$, to prevent tipping over of the pump in that direction, and its other end $k^2$ is turned up to admit of tipping in that direction—that is to say, this plate prevents the tipping over of the pump away from the tire or other object being inflated and permits tipping toward such object, in the first instance preventing dislocation of the pump from the object and in the other serving to increase the adhesion of the washer on the object and reinforcing the connection. The plate also affords a foothold of increased area for the user.

As will be observed in the preferred construction, the discharge-tube $f$ projects from the pump at a right angle to the stirrup—that is to say, in the direction of the length of the foot of the operator when using the pump—instead of in line with the stirrup, as has heretofore been proposed, and this is the natural, as well as the most convenient, position in use and for application of the spout to the object to be inflated.

While I have thus described and in the accompanying drawings illustrated what I consider the best mode in which I have contemplated applying the principle of my invention, I wish not to be understood as thereby limiting my invention, since many alterations may be made both in structure and arrangement and yet be within the principle of my invention.

What I claim is—

1. An air-pump, comprising essentially a pump barrel or cylinder, a cap for closing the lower end of the barrel or cylinder, having an exit-chamber, a stirrup rigidly attached to the exit-chamber of the cap, and a rigid pipe or tube rigidly projecting from said chamber at right angles to the stirrup and in line with the length of the foot of the operator when using the pump, and having a downwardly-extended spout or coupling, and an elastic washer in the end of said spout or coupling which is adapted to engage the valve-nipple of a tire or the inlet to any other object to be inflated, substantially as described.

2. The combination in an air-pump, of a pump barrel or cylinder, a cap for closing the lower end thereof, having an exit-chamber, a stirrup rigidly attached to the exit-chamber of the cap, and a rigid pipe or tube, rigidly projecting from said chamber at right angles to the stirrup and in line with the length of the foot of the operator when inserted in the stirrup, a spout extending downwardly from said tube and containing an elastic washer for engaging the object to be inflated, and a perforated screw-cap applied to said spout and adapted to permit ready access to and removal of said washer, substantially as described.

3. An air-pump, having a barrel or body, a cap for closing the discharge end thereof, a rigid tube projecting laterally from said cap, an application-spout for connection with an object to be inflated, a stirrup, and a rivet for uniting the cap and stirrup and with which the inner end of the tube engages, substantially as described.

4. The combination in an air-pump, of a pump barrel or cylinder, a cap applied to the end of said barrel or cylinder, a stirrup or foot-rest, a rivet passed transversely through the cap and stirrup and rigidly uniting them, a rigid laterally-projecting pipe or tube having its inner end rigidly connected with said rivet and its outer end provided with a downwardly-extended spout or coupling, and an elastic washer in the end of said spout or coupling adapted to engage the object to be inflated, substantially as described.

5. An air-pump, having a body, a cap, a stirrup applied to said cap, an air-discharge device comprising a rigid tube inserted in said cap, and a rivet passed through the stirrup ends and the cap and tube and rigidly uniting them, substantially as described.

6. An air-pump, having a stirrup provided with a foothold, the opposite edges of which are curved in different directions, substantially as described.

7. An air-pump, having a stirrup, the tread portion of which has one edge turned downwardly and the other edge turned upwardly, substantially as described.

8. An air-pump, having a laterally-projecting rigid air-discharge device adapted for direct connection to the object to be inflated, and a stirrup having one edge turned downwardly to prevent tipping over of the pump in that direction, substantially as described.

9. An air-pump, having a laterally-projecting rigid air-discharge device adapted for direct connection with the object to be inflated, and a stirrup having an attached foot-plate, one edge of which is turned down and the other turned up, substantially as described.

In testimony whereof I have hereunto set my hand this 6th day of May, A. D. 1899.

GEORGE W. EDDY.

Witnesses:
GEO. F. HODGES,
C. M. DEMOTT.